Dec. 21, 1926.
C. F. MERONI
1,611,480
INDICATOR
Filed Sept. 8, 1925
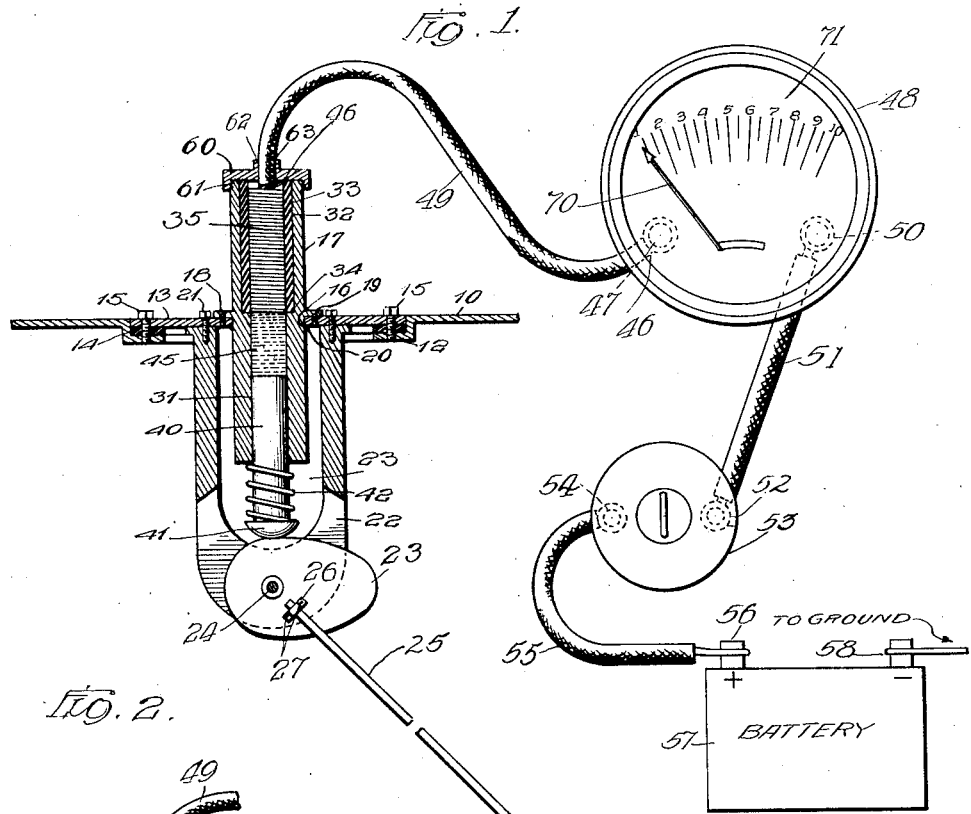
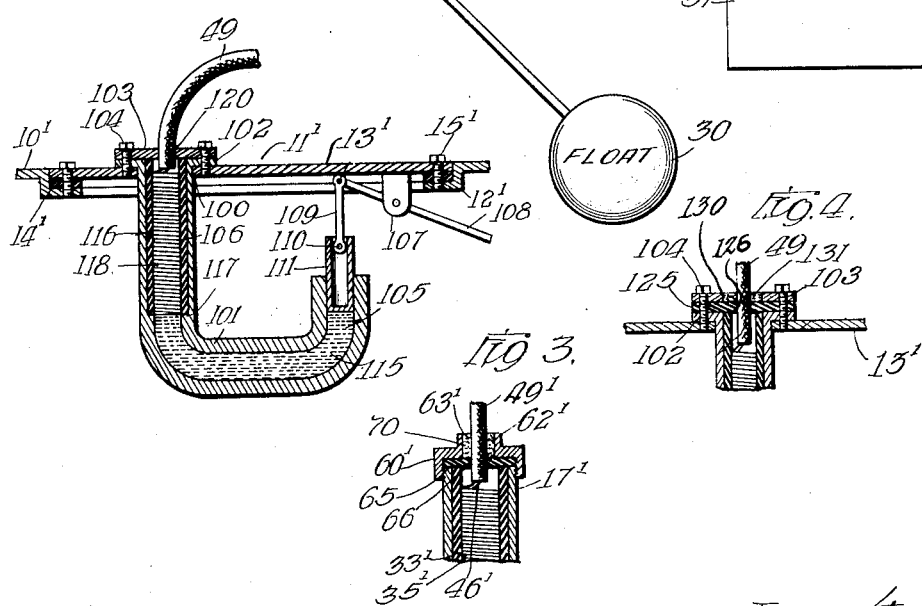
Witnesses:
William P. Kilroy
Harry C. White
Inventor:
Charles F. Meroni
By Brown, Borttner - Dennes
Attys Patented Dec. 21, 1926.

1,611,480

UNITED STATES PATENT OFFICE.

CHARLES F. MERONI, OF CHICAGO, ILLINOIS.

INDICATOR.

Application filed September 8, 1925. Serial No. 55,184.

My invention in general relates to measuring mechanism and more particularly to indicators or gauges responsive to variations in the level of a liquid in a container. More specifically, the present invention pertains to electrical indicators or gauges for indicating the amount of liquid in a tank, such for example, as the amount of gasoline in a tank on an automobile.

Obviously, in the case of automobiles, it is desirable to mount the indicator or gauge where it can be observed by the operator of the vehicle at all times. Naturally, the most logical place to mount such a gauge is on the dash board of the vehicle.

Now, in order to mount a gauge on the dash board, it is necessary that some suitable connection be employed between it and the gasoline tank so as to cause it to be responsive to the variations of the level of the gasoline in the tank. The connection employed may be either mechanical or electrical.

Heretofore, in the automobile art, mechanical connections have been used more extensively than electrical connections for the above mentioned purpose. Such mechanical connections are not only quite frequently highly impractical and cumbersome, but get out of order very easily and do not respond as readily and positively as electrical connections. On the other hand, electrical connections for the above purpose are as a rule very simple, less apt to get out of order, and as a whole, more desirable than mechanical connections.

The reason why mechanical connections have been used more extensively than electrical connections, is that electrical connections increase the fire hazards of an automobile and, hence, increase the cost of insuring automobiles against fire. In other words, the gasoline vapors escaping from the gasoline tank are apt to become ignited by sparks emanating from the electrical connection.

I propose, in accordance with the features of the present invention, to provide a gauge having electrically operated mechanism wherein any possibility of the escaping gasoline vapors becoming ignited thereby, is completely obviated. It is believed that gauges made in accordance with the features of my invention will meet with the approval of the Board of Underwriters and that, hence, the fire insurance rates on automobiles employing such gauges will be cheaper.

I also propose to provide a gauge or tell tale wherein a liquid, such for example, as mercury, is utilized both as a seal and as an electrical contact medium. As will become more apparent as the accompanying description progresses, the same liquid is employed for varying the resistance in an electrical circuit which controls the operation of an indicating device.

An object of the present invention is to provide an improved measuring device of simple, compact, and inexpensive construction.

Another object of the present invention is to provide an electrically operated gasoline gauge wherein any possibility of gasoline vapors becoming ignited by sparks emanating from the electrical parts is completely obviated.

A further object of the present invention is to provide a gauge wherein a liquid is utilized both as a sealing medium and as a means for varying the resistance in an electrical circuit in accordance with the variations of the amount of a liquid in a tank.

A still further object of the present invention is to provide a gauge wherein a body of liquid such as mercury is employed, both as a seal and as an electrical contact medium.

In accordance with the general features of my invention, I have designed a gauge to be hereinafter described in detail, wherein a single body of mercury is provided which is responsive to variations of the level of a liquid in a tank for varying the resistance in an electrical circuit which operates an indicating device. The same body of mercury is also utilized both as a sealing medium for entraining any sparks which might emanate from the electrical parts adjacent the tank and as an electrical contact medium of the aforesaid electrical circuit.

Other objects and advantages of my invention will more fully appear from the following detailed description taken in connection with the accompanying drawing which illustrate several embodiments thereof, and in which—

Fig. 1 is a fragmentary view, partly in section, illustrating one embodiment of my invention;

Fig. 2 is a fragmentary sectional view illustrating another form of my invention;

Fig. 3 is a fragmentary sectional view of a modified form of cap for the gauge illustrated in Fig. 1; and Fig. 4 is a fragmentary sectional view of modified form of cap construction for the gauge illustrated in Fig. 2.

Referring now to the drawing in detail, in which like reference numerals designate similar parts throughout the several views, 10 denotes a tank or container, such as a gasoline tank on an automobile. This tank may be of any usual or suitable construction. The top of the tank 10 is provided with an opening 11 preferably circular in form. The edge of the top of the tank 10 adjacent this opening 11 is provided with an annular shoulder 12 upon which is carried a plate 13 made of any suitable metallic material. Disposed intermediate the plate 13 and the shoulder 12 is a cork washer or gasket 14. The plate 13 and the washer 14 are fastened to the shoulder or ledge 12 by bolts 15. Although I have disclosed the washer 14 as being preferably made of cork, it is of course obvious that it may be made of any other suitable or desirable material. The function of this washer or gasket is to provide a relatively air tight connection between the plate 13 and the shoulder 12.

The plate 13 is equipped with a substantially central circular aperture 16 in which is disposed a tubular casing 17. This casing may be made of any suitable material, such for example, as brass or steel. The casing 17 is supported upon the plate 13 by an annular shoulder 18 formed thereon. Bolts 19 extend through this shoulder 18 into the cover plate 13 to rigidly fasten the tube 17 thereto. Instead of employing a shoulder 18 to fasten the tube 17 to the plate 13, the tube may be welded or soldered thereto if it is so desired. The reference numeral 20 denotes a solder connection between the tube 17 and the under face of the plate 13.

Fastened to the under face of the plate 13 by bolts 21 is a bracket-like member 22, the center of which is preferably cut away, as indicated by reference numeral 23', in order to lighten its weight. Pivotally mounted to the lower part of the bracket 22 is a cam 23 which has a lead calculated to meet the particular requirements of my device. The cam 23 may be revolvably mounted upon a pin 24 suitably attached to the bracket 22. The cam may be punched out of any suitable material by any usual type of punch press.

A rod 25 is fastened at one end to the face of the cam. The rod 25, if it is so desired, may be tubular in form in order to give it a minimum weight. This rod may be attached to the cam by a suitable clip 26 and bolts 27. The other end of the rod 25 has fastened thereto a float 30 which is adapted to move with the level of the fluid or gasoline in the tank 10.

Referring back now to the casing 17, it will be noted that it is provided with a central bore 31 countersunk at its upper end 32. Positioned in the countersunk portion 32 of the bore 31 is a sleeve 33 made of any suitable insulating material. The lower end of this sleeve abuts a shoulder 34 in the casing 17. Imbedded in the inside wall of the sleeve 33 is a coil of resistance wire 35. The wire used may be of nickel, silver, copper, or any other desired kind of wire.

Now I desire it understood that although I have disclosed the sleeve 33 with the resistance wire 35 imbedded in its inner wall as the preferred form of my invention, that any other suitable analogous construction may be used in place thereof, as for example, a tube provided with taps, such as is well known in the art. That is to say, instead of imbedding the wire in the inside wall of the sleeve 33, taps could be extended into the inside of the sleeve at various positions and connected to the circuit to be hereinafter more fully described.

Positioned in the lower part of the bore 31 is a plunger 40 provided at its lower end with a head 41. Disposed intermediate the head 41 and the bottom of the casing 17 is a spring 42 which tends to at all times urge the plunger downwardly. The head 41 of the plunger 40 contacts the periphery of the cam 23 at all times due to the urging tendency of the spring 42. The plunger 40 is fitted relatively tight into the bore 31 but with sufficient amount of play to permit of its easy reciprocation in said bore. Carried on the top of the plunger 40 in the bore 31 is a body of liquid 45, such as mercury. This body of mercury serves as a seal to prevent any vapors which might pass up around the plunger 40 in the bore 31 from getting into the inside of the sleeve 33. Thus it will be seen that I have provided a very effective seal between the vapor in the tank and resistance coil 35 in the sleeve 33.

The upper end of the resistance coil 35 is connected to an electrical conductor 46 which is connected at its other end to the terminal 47 of a gauge 48. The conductor 46 is preferably enclosed in a cord 49. Another terminal 50 of the gauge 48 is connected to one end of an electrical conductor 51, the other end of which is connected to a terminal 52 of a switch 53. The other terminal 54 of the switch is connected to one end of a conductor 55 whose other end is connected to the positive terminal 56 of a battery 57. The negative terminal 58 of the battery 57 is grounded to the chassis of the motor vehicle.

Both the gauge 48 and the switch 53 may be mounted on the dash of the automobile if it is so desired. Also, instead of employing a separate switch, the switch 53 may be the ignition switch of the automobile. That is to say, the equipment just described would be only put into use in that event when the automobile is in use or when the ignition switch of the automobile is turned to its closed position. The battery 57 may be the same battery as is employed in the ignition circuit of the automobile.

As illustrated in Fig. 1, the top of the casing 17 may be provided with a cap 60 threaded thereon at 61. The cap 60 may be equipped with a boss 62 having an aperture 63 through which the cord 49 passes. Obviously, by unscrewing the cap 60 access may be had to the connection between the conductor 46 and the resistance coil 35.

In Fig. 3 I have disclosed an alternative way of fastening the cord 49 to the top of the casing member 71. In this construction, a disc of insulating material 65 is disposed intermediate a cap 60' screwed onto the top of the casing member 17'. The cap 60' is provided with a boss 62' having an aperture 63'. A cord 49' passes through the aperture 63' and an aperture 66 in the disc 65 of insulating material into the inside of the sleeve 33'. The conductor 46' of the cord 49' is connected to the upper end of a resistance coil 35'. A suitable filling 70 is poured into the aperture 63' around the cord 49' after the cap 60' has been screwed into place. This filling 70 may consist of paraffin, wax or any other analogous material. This filling constitutes a seal which serves to seal the inside of the sleeve 33' from any moisture or vapor which might exist outside of the tank 10. Thus it will be seen that my novel resistance coil 35 may be sealed at both ends to prevent any moisture or vapor from getting thereto.

The gauge 48 is provided with a dial 70 and suitable indicating data 71. The indicating data may be in terms of gallons of liquid in the tank or may be in terms of "1/4", "1/2", "3/4", etc. The gauge is of such a character that variations in the current in the circuit associated therewith will cause the dial 70 thereof to be moved in response thereto. Such a gauge may be of the galvanometer type and is well known in the instrument art. It only differs from the usual type of instrument in the indicating data employed. It is therefore believed that no further description need be made of the gauge 48.

The operation of my indicating device is thought to be apparent from the foregoing description. Assuming that the switch 53 is closed and the circuit in operation, current will flow from the negative side of the battery through the chassis of the motor vehicle, the wall of the tank to the casing member 17 and the body of mercury 45. Now since the end of the conductor 46 associated with the casing 17 is insulated therefrom, the current must necessarily flow through the resistance coil 35 to reach this conductor. Obviously, by moving the body of mercury 45 up and down inside the sleeve 33 the amount of resistance in the electrical circuit may be varied.

When the tank 10 is filled with liquid or gasoline, the float 30 will rise to the top of the liquid within the tank. As the liquid is withdrawn from the tank, the float will be caused to fall with the liquid. Through the cam 23 the plunger 40 will also be caused to move downwardly. The body of mercury 45 on the plunger 40 will move with the plunger, thus causing more of the resistance coil 35 to be imposed in the electrical circuit, varying the current flowing through the indicating device or gauge 48, causing the dial 70 thereof to move and indicate the drop in the amount of fluid within the tank.

It is evident therefore, that in addition to serving as a seal, the body of mercury 45 serves as an electrical contact making medium and also as a resistance varying medium. Obviously, by varying the resistance in the circuit of the indicating device 48, the amount of current flowing through this device will be varied.

Furthermore, although I have shown the body of mercury 45 as being adapted to increase the amount of resistance in the circuit, when the liquid level in the tank drops, it is of course to be understood that the indicating device could be made to work equally well if my device should be so built that the body of mercury would be caused to decrease the amount of resistance in the circuit as the float drops. Another ideal arrangement is shown in my other form of the invention illustrated in Fig. 2.

In Fig. 2, 10' denotes a tank for containing gasoline or other fluid. The tank is preferably associated with the motor vehicle in the same manner as tank 10 in Fig. 1. The top of the tank is equipped with a circular aperture 11' in which is disposed a plate 13'. The plate 13' is supported upon an annular shoulder 12' formed on the top of the tank 10'. Disposed intermediate the plate 13' and shoulder 12' is a cork washer or gasket 14'. The plate and washer are fastened to the shoulder 12' by suitable bolts 15'.

The plate 13' is provided with a circular opening 100 in which one end of a U-shaped tube 101 passes. This end of the tube is provided with an annular flange 102 which rests on the top of the plate 13'. A cover plate 103 is fastentd to the flange 102 and the plate 13' by bolts 104. The U-shaped tube 101 is provided with a bore 105 countersunk at one end 106. The other end of the U-shaped tube 101 is disposed inside of the tank 10' immediately below the cover plate 13'. Pivotally mounted intermediate its ends to a bracket 107 secured to the under side of the plate 13′ is a rod 108, to one of which is fastened a float, such as float 30 indicated in Fig. 1. The other end of this rod 108 is pivotally attached to a link 109 connected to a wrist pin 110 attached to the inner wall of a piston 111 fitted into the free end of the tube 101. The piston 111 need not fit very tightly in the bore 105. It should be fitted therein just tight enough to permit of its easy reciprocation in the bore. The rod 108 constitutes a lever in this construction. The float leg of the lever may be made considerably longer than the end or leg attached to the link 109. Thus it will be seen that whereas one leg of the lever will move through a relatively great distance, the other leg of the lever will move through a very short arc, but will be capable of transmitting a comparatively great amount of force to the piston 111. Disposed in the bore 105 of the tube or U-shaped member 101 is a body of mercury 115 which is adapted to be reacted upon by the plunger 111. The end of the U-shaped tube 101 fastened to the plate 13′ has mounted therein a sleeve 116. The sleeve 116 is disposed in the enlargement 106 of the bore 105. Its lower end rests against a shoulder 117 formed in the wall of the tube. This sleeve 116 is substantially the same as sleeve 33 disclosed and described in connection with Fig. 1. It has imbedded in its inner wall a resistance coil of wire 118. This sleeve is preferably made of insulating material as was discussed previously.

The upper end of the resistance coil 118 may be connected to an electric conductor 49 in the same way as has been discussed in connection with Fig. 1. The conductor 49 passes through an aperture 120 in the clamping plate 103.

In Fig. 4 I have disclosed an alternative way of fastening the upper end of the U-shaped tube to the plate 13′. In this instance, a circular disc of insulating material 125 disposed intermediate the clamping plate 103 and the annular flange 102. The plate, disc and flange are all bolted to the top piece 13′ by suitable bolts 104. The disc 125 is provided with a substantially central aperture 126 through which the conductor 49 passes. The plate 103 is also provided with an enlarged aperture 130 in which is disposed a filling of wax or other sealing medium 131. This insulates the upper end of the tube 101 from the outside of the tank in much the same manner as the upper end of the tube 17 was insulated from the outside of the tank in the device illustrated in Fig. 1.

The operation of my device illustrated in Fig. 2 is substantially like that of the device illustrated in Fig. 1. As the level of liquid within the tank drops, the plunger or piston 111 is raised by the lever rod 108. This causes the mercury to flow from the countersunk portion of the tube 101 to the other leg of this tube. That is to say, the mercury that is in the tube or sleeve 116 is lowered, thus causing more of the resistance coil to be imposed in the electrical circuit of the indicating gauge. The indicating gauge is not shown in this instance, inasmuch as the conductor 49 is connected to a gauge 48 in the same way as illustrated in Fig. 1. The gauge may be in turn connected to a switch and the switch to a battery also in the same manner as disclosed in Fig. 1. It is not believed to be necessary to show this arrangement in connection with the modification illustrated in Fig. 2, inasmuch as it is fully illustrated in Fig. 1 and its connection with the device illustrated in Fig. 2 is believed to be obvious.

In recapitulation it will be seen that I have provided an indicating device or gauge for indicating the level of a liquid within a tank wherein a body of liquid is disposed between the electrical parts and the actuating mechanism within the tank which serves not only as a liquid seal, but as a medium for varying the resistance in the electrical circuit associated with a gauge, thus varying the position of the dial or indicator on the gauge.

My gasoline indicating gauge is one that is not only comparatively simple, compact and inexpensive, but is one which reduces the fire hazards usually present or involved in the use of such gauges.

Also the indicating instrument may be mounted on the dash of the automobile, thereby enabling the motorists to at all times be aware of the condition of the gasoline in its tank. Since the gauge makes use of the automobile batteries, no additional power is necessary for the operation of my device.

Now I desire it understood, that although I have disclosed the two preferred embodiments of my invention, that the invention is not to be limited thereby, but only in so far as defined by the scope and spirit of the appended claims.

I claim :—

1. In combination, a liquid container, a float disposed in the container adapted to rise and fall with the liquid therein, a tubular member associated with the container for holding a body of fluid matter, a plunger associated with the said tubular member for moving the body of fluid matter, means connecting the plunger to the float for causing the said plunger to be moved by the float, an electric circuit associated with the said body of fluid matter, and means for causing the said body of fluid matter to vary the resistance in the electric circuit.

2. In combination, a liquid container, a tubular member associated with the container, a movable member disposed in one part of the tubular member, a resistance disposed in another part of the said tubular member, a liquid seal disposed in the member between the resistance and the movable member, means for causing the movable member to respond to variations in the level of the liquid in the container and to move the said liquid seal, and an electric circuit associated with the resistance, the said moving of the said liquid seal varying the amount of the resistance placed in the circuit.

3. In combination, a liquid container, a float disposed in the container adapted to rise and fall with the liquid therein, a tubular member associated with the container, a plunger disposed in one part of the tubular member, means for causing the plunger to be moved by the fall of the level of the liquid in the container, a resistance disposed in another part of the said member, a liquid seal disposed in the said member between the plunger and the resistance adapted to be moved by the said plunger, and an electric circuit associated with the said resistance, the moving of the said liquid seal causing the amount of the resistance placed in the circuit to be varied.

4. In combination, a liquid container, an electric circuit including a resistance associated therewith, means associated with the container for supporting a column of liquid cooperable with the resistance to vary the amount of the same imposed in the circuit, and movable means connected with the column of liquid and operable by the variations in the level of the liquid in the container to cause a movement between the column of liquid and the resistance and to thus vary the resistance in the circuit, the said column of liquid constituting a liquid seal between the movable means and the resistance to prevent vapors escaping from the liquid in the container, from reaching the resistance.

In witness whereof, I hereunto subscribe my name this 4th day of September, 1925.

CHARLES F. MERONI.